(12) United States Patent
Wandzilak

(10) Patent No.: US 7,855,478 B2
(45) Date of Patent: Dec. 21, 2010

(54) MACHINE FOR GENERATING RECIPROCAL MOTION AND RELATED METHOD

(76) Inventor: Brian Wandzilak, 19 Devanshire Dr., Darien, CT (US) 06820

( * ) Notice: Subject to any disclaimer, the term of this patent is extended or adjusted under 35 U.S.C. 154(b) by 162 days.

(21) Appl. No.: 12/242,996

(22) Filed: Oct. 1, 2008

(65) Prior Publication Data

US 2010/0079013 A1   Apr. 1, 2010

(51) Int. Cl.
*H02K 7/06* (2006.01)

(52) U.S. Cl. .................................................. 310/20

(58) Field of Classification Search .................. 310/20, 310/37, 15
See application file for complete search history.

(56) References Cited

U.S. PATENT DOCUMENTS

| | | | |
|---|---|---|---|
| 2,943,216 A | 6/1960 | Spodig | |
| 3,703,653 A | 11/1972 | Tracy et al. | |
| 3,773,439 A | 11/1973 | Sheridan | |
| 3,811,058 A | 5/1974 | Kiniski | |
| 3,879,622 A | 4/1975 | Ecklin | |
| 3,967,146 A | 6/1976 | Howard | |
| 4,011,477 A | 3/1977 | Scholin | |
| 4,196,365 A | 4/1980 | Presley | |
| 4,207,773 A | 6/1980 | Stahovic | |
| 4,300,067 A | 11/1981 | Schumann | |
| 4,371,798 A | 2/1983 | Kuroda | |
| 4,671,745 A | 6/1987 | Smith | |
| 5,432,382 A | 7/1995 | Pawlowski | |
| 6,731,035 B2 | 5/2004 | Mu et al. | |
| 7,235,909 B2 | 6/2007 | Moe | |
| 7,385,325 B2 * | 6/2008 | Tkadlec | 310/80 |
| 7,564,153 B2 * | 7/2009 | Ucer | 310/80 |
| 2004/0183387 A1 | 9/2004 | Moe | |
| 2006/0067842 A1 | 3/2006 | Meucci | |
| 2006/0131887 A1 | 6/2006 | Gosvener | |
| 2006/0267418 A1 | 11/2006 | Kundel | |
| 2007/0170799 A1 | 7/2007 | Snyder | |
| 2007/0210659 A1 | 9/2007 | Long | |

OTHER PUBLICATIONS

Introduction to Electrodynamics, Davis J. Griffiths, 1999, Prentice Hall Inc, p. 207.*

* cited by examiner

*Primary Examiner*—Nguyen N Hanh
(74) *Attorney, Agent, or Firm*—Allen Dyer Doppelt Milbrath & Gilchrist

(57) ABSTRACT

A machine for generating reciprocal motion includes a first magnet rotatable about a first magnet axis, a second magnet spaced apart from the first magnet and rotatable about a second magnet axis, and a third magnet arranged between the first and second magnets and reciprocatable therebetween. A switching mechanism is associated with the first and second magnets to rotate the first and second magnets between a first position, in which the first and second magnets respectively attract and repel the third magnet, and a second position, in which the first and second magnets respectively repel and attract the third magnet. The third magnet can be reciprocatable along a reciprocation axis that is substantially perpendicular to the first and second magnet axes. The switching mechanism can include a first suspended weight that is selectively releasable to impel rotation of at least one of the first and second magnets.

20 Claims, 8 Drawing Sheets

MACHINE FOR GENERATING RECIPROCAL MOTION AND RELATED METHOD

FIELD OF THE INVENTION

The present invention relates to machines for generating reciprocal motion and related methods, and more particularly, to machines for generating reciprocal motion using magnetism.

BACKGROUND OF THE INVENTION

In the past, machines have been devised for switching opposed magnet polarities to cause reciprocal motion in a magnet placed therebetween. However, providing a motive force to such machines can result in an unwieldy arrangement. Additionally, harnessing the reciprocal motion generated by the machine to perform some other type of work can be challenging.

SUMMARY OF THE INVENTION

In view of the foregoing, it is an object of the present invention to provide an improved machine and method for generating reciprocal motion. According to an embodiment of the present invention, a machine includes a first magnet rotatable about a first magnet axis, a second magnet spaced apart from the first magnet and rotatable about a second magnet axis, and a third magnet arranged between the first and second magnets and reciprocatable therebetween. A switching mechanism is associated with the first and second magnets to rotate the first and second magnets between a first position, in which the first and second magnets respectively attract and repel the third magnet, and a second position, in which the first and second magnets respectively repel and attract the third magnet.

According to an aspect of the present invention, the third magnet is reciprocatable along a reciprocation axis and the reciprocation axis is substantially perpendicular to the first and second magnet axes. According to another aspect of the present invention, the switching mechanism includes a first suspended weight that is selectively releasable to impel rotation of at least one of the first and second magnets.

According to a method aspect, a method for generating reciprocal motion includes orienting opposed first and second magnets such that a third magnet is attracted to the first magnet and repelled from the second magnet. Once the third magnet reaches a first predetermined point, a first suspended weight is released long enough to rotate the first and second magnets such that the third magnet is repelled from the first magnet and attracted to the second magnet. Once the third magnet reaches a second predetermined point, the first suspended weight or a second suspended weight is released long enough to rotate the first and second magnets such that the third magnet is attracted to the first magnet and repelled from the second magnet.

These and other embodiments, aspects, objects and advantages of the present invention will be better understood in view of the drawings and the following description of preferred embodiments.

DETAILED DESCRIPTION OF PREFERRED EMBODIMENTS

Figure 1:
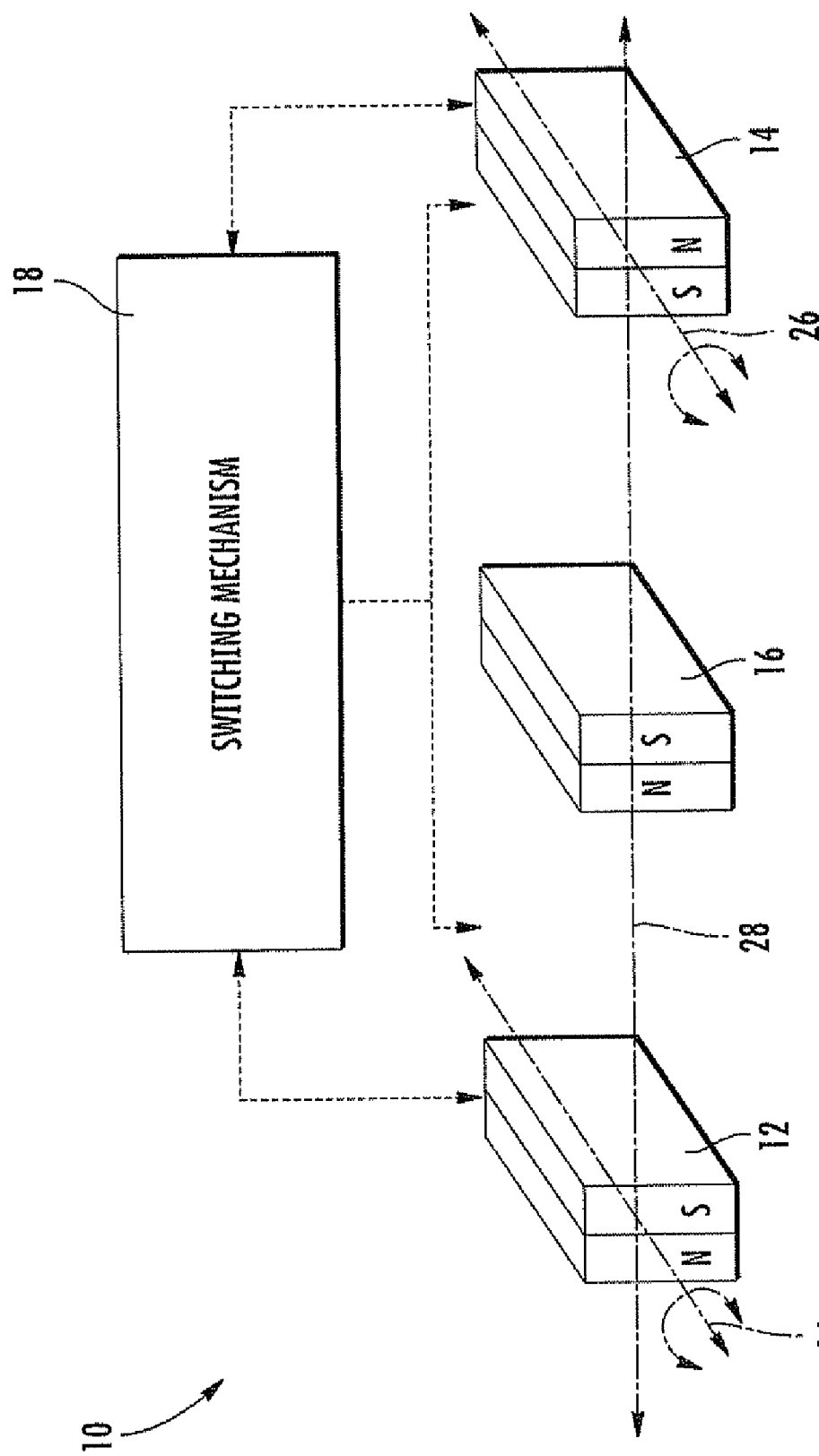
FIG. 1 is a schematic view of a machine for generating reciprocal motion, including a switching mechanism and first, second and third magnets, according to an embodiment of the present invention.

Referring to FIG. 1, according to an embodiment of the present invention) a machine 10 for generating reciprocal motion includes opposed first and second magnets 12, 14, a third magnet 16 arranged between the first and second magnets 16, and a switching mechanism 18 associated with the first, second and third magnets 12-16. The first and second magnets 12, 14 are rotatably mounted about respective first and second magnet axes 24, 26. The first and second magnet axes 24, 26 are substantially parallel. The third magnet 16 is slidably mounted between the first and second magnet axes 24, 26, such that the third magnet 16 is reciprocatable between the first and second magnets 12, 14 along a reciprocation axis 28.

The switching mechanism 18 is configured to detect the position of the third magnet 16, and based on the detected position, to rotate the first and second magnets 12, 14 to generate reciprocal motion in the third magnet 16. The generation of reciprocal motion in the third magnet 16 will be explained with reference to FIGS. 2-4.

Figure 2:
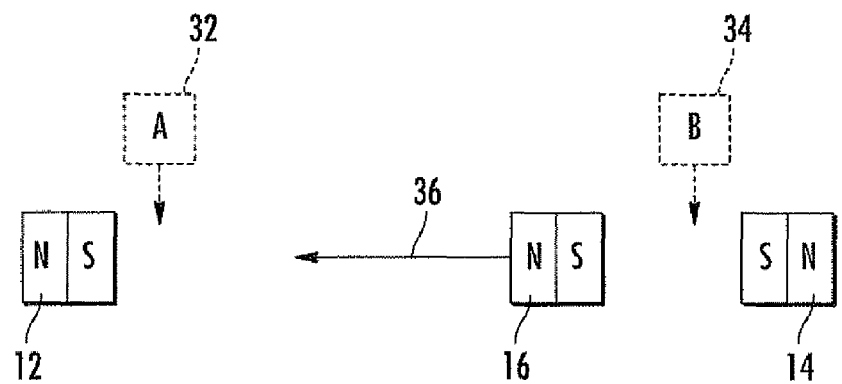
FIGS. 2-4 are schematic views of the basic operation of the machine of FIG. 1.

Referring to FIG. 2, the first and second magnets 12, 14 are in a first position, and third magnet 16 is between first and second predetermined points 32, 34. In the first position, the polarity of the first magnet 12 attracts the third magnet 16 and the polarity of the second magnet 14 repels the third magnet 16. As a result, the third magnet 16 moves in the direction of arrow 36, towards the first magnet 12.

Figure 3:
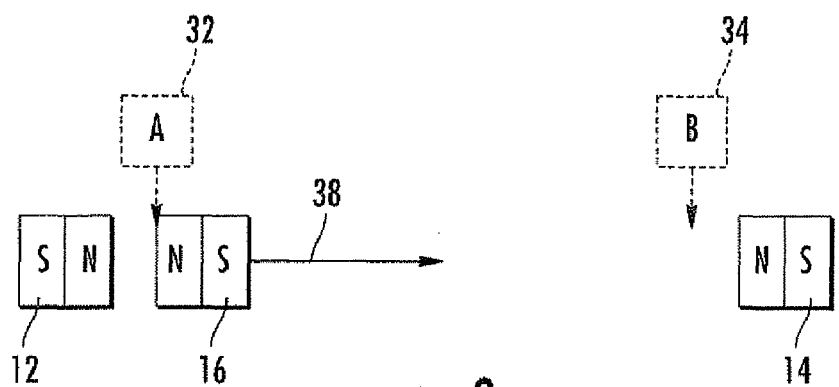

Referring to FIG. 3, the third magnet 16 eventually reaches the first predetermined point 32, as detected by the switching mechanism 18 (see FIG. 1). In response, the switching mechanism 18 causes the first and second magnets 12, 14 to rotate into a second position. In the second position, the polarity of the first and second magnets 12, 14 are reversed from the first position; the first magnet 12 repels the third magnet 16 and the second magnet 14 attracts the third magnet 16. As a result, the third magnet 16 moves in the direction of arrow 38, towards the second magnet 14.

Figure 4:
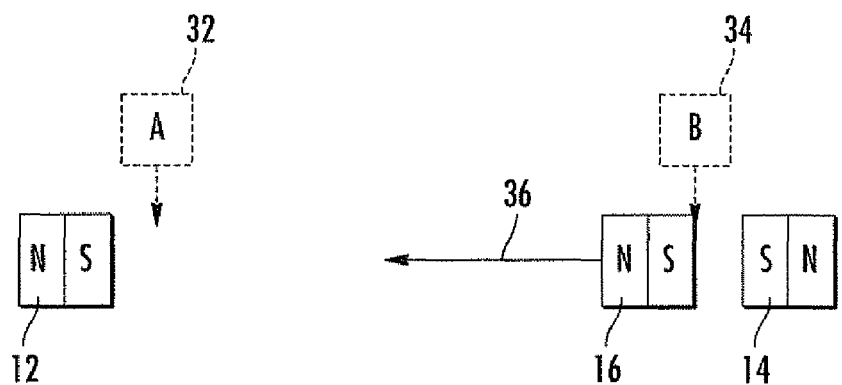

Referring to FIG. 4, the third magnet 16 eventually reaches the second predetermined point 34, as detected by the switching mechanism 18. In response, the switching mechanism 18 causes the first and second magnets 12, 14 to rotate back to the first position and the third magnet 16 moves back towards the first magnet 12 in the direction of the arrow 36.

Figure 5:
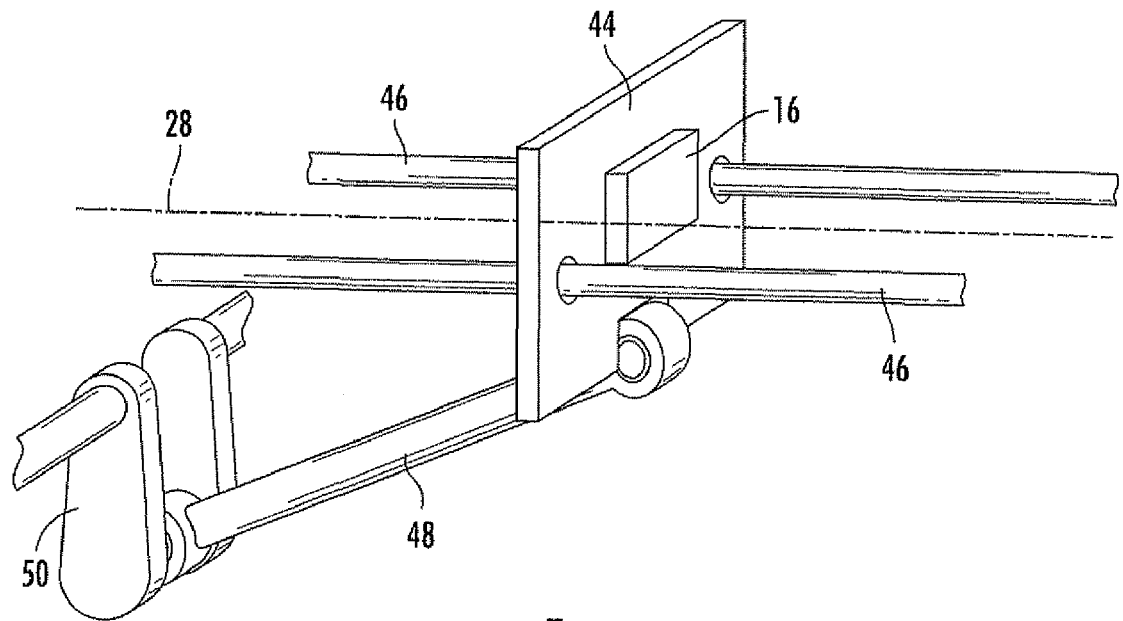
FIG. 5 is a partial perspective view of the machine of FIG. 1 adapted to convert reciprocal motion to rotational motion.

Referring to FIG. 5, according to an aspect of the present invention, the reciprocal motion of the third magnet 16 is convertible into rotational motion. The third magnet 16 is arranged in a plate 44. Rails 46 extend through the plate 44 substantially parallel to the reciprocation axis 28 and guide the third magnet 16 in reciprocal motion between the first and second magnets 12, 14 (see FIG. 1). A connecting rod 48 extends between the third magnet 16 and a crankshaft 50. The connecting rod 48 is pivotally mounted to the plate 44 and the crankshaft 50 such that the reciprocal motion of the third magnet 16 is transferred through the connecting rod 48 to the crankshaft 50 and converted into rotational motion.

Figure 6:
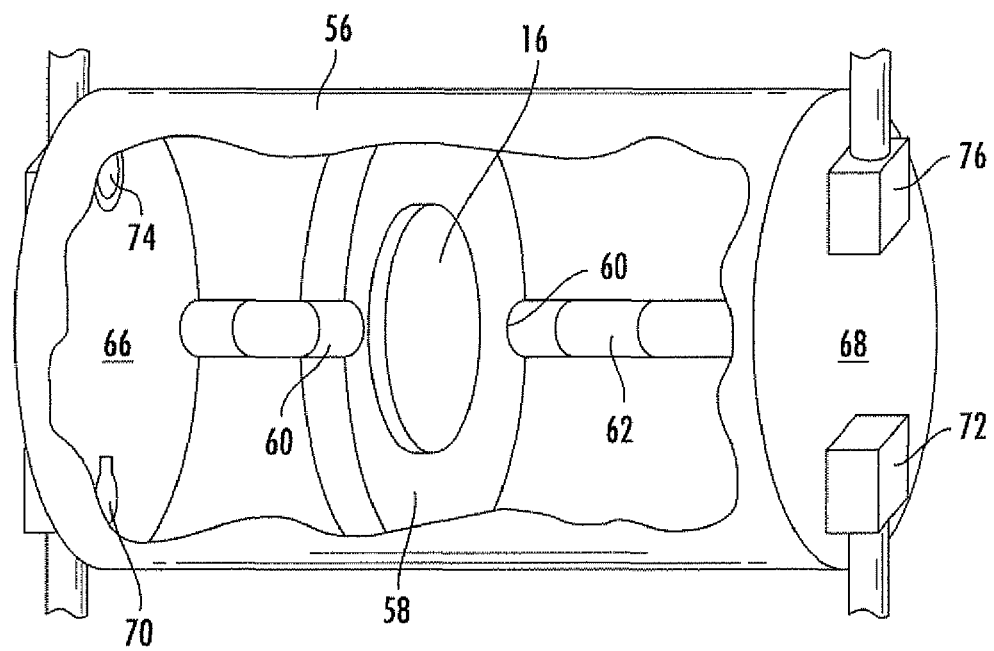
FIG. 6 is a partial perspective view, partially cut-away to show internal components, of the machine of FIG. 1 adapted to pump a fluid.

Referring to FIG. 6, according to another aspect of the present invention, the reciprocal motion of the third magnet 16 can be used to pump a fluid. The third magnet 16 is arranged in a fluid-tight enclosure 56. The third magnet is arranged in a plate 58 formed with notches 60. The notches 60 engage rails 62 (only one shown in FIG. 6) along the length of the enclosure 56 to guide the third magnet 16 in reciprocal motion between the first and second magnets (see FIG. 1). First and second enclosure ends 66, 68 have respective first and second fluid inlets 70, 72 and outlets 74, 76

In operation, when the third magnet 16 moves toward the first end 66, fluid is expelled through the first outlet 74 and inducted through the second inlet 72. The first inlet 70 and the second outlet 76 are closed. When the third magnet 16 moves toward the second end 68, fluid is inducted through the first inlet 70 and expelled through the second outlet 76. The first outlet 74 and the second inlet 72 are closed.

Figure 7:
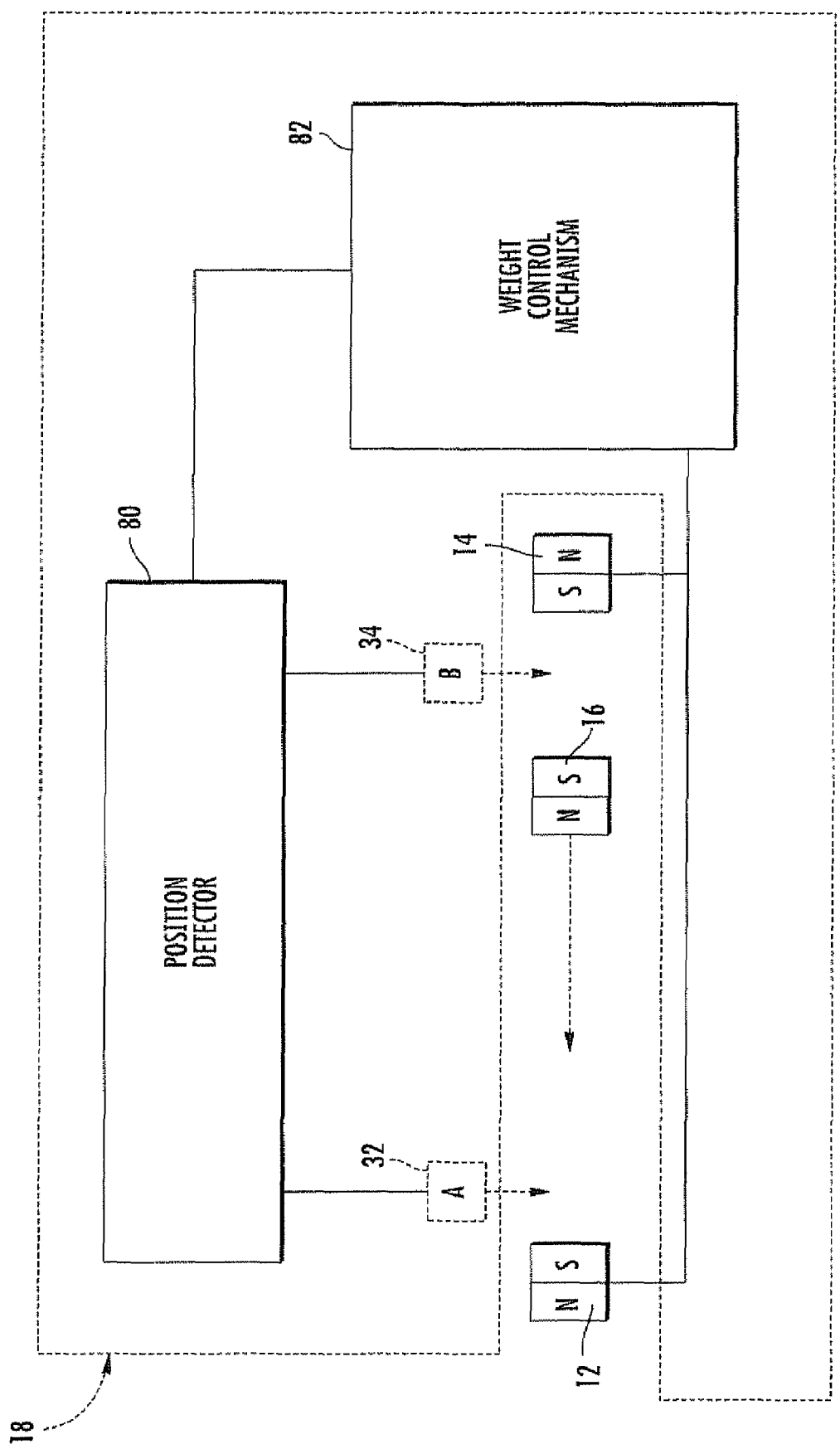
FIG. 7 is a schematic view of the machine of FIG. 1, including a position detector and a weight control mechanism of the switching mechanism.

Referring to FIG. 7, an exemplary embodiment of the switching mechanism 18 is explained in greater detail. The switching mechanism 18 includes a position detector 80 and a weight control mechanism 82. The position detector 80 is configured to detect when the third magnet 16 reaches first and second predetermined points 32, 34 proximate to the first and second magnets 12, 14, respectively. The position detector 80 supplies an input to the weight control mechanism 82, which rotates the magnets 12, 14 to generate the reciprocal motion of the third magnet 16.

Figure 8:
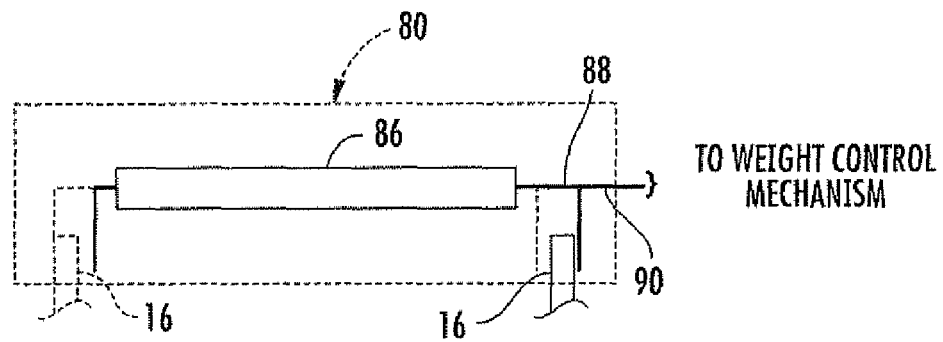
FIG. 8 is a schematic view of an embodiment of the position detector of FIG. 7.

Referring to FIG. 8, the position detector 80 includes a mounting bracket 86 with slidably-mounted element 88 extending therethrough (alternate position shown in broken lines). The element 88 is engaged by the third magnet 16 (or an associated plate or the like) when the first or second predetermined point 32, 34 (see FIG. 7) is reached. The element 88 is displaced to the broken-line position when the third magnet 16 reaches the first predetermined position 32 and to the solid-line position when the third magnet 16 reaches the second predetermined position 34. An extension 90 mechanically links the position detector 80 with the weight control mechanism 82.

Figure 9:
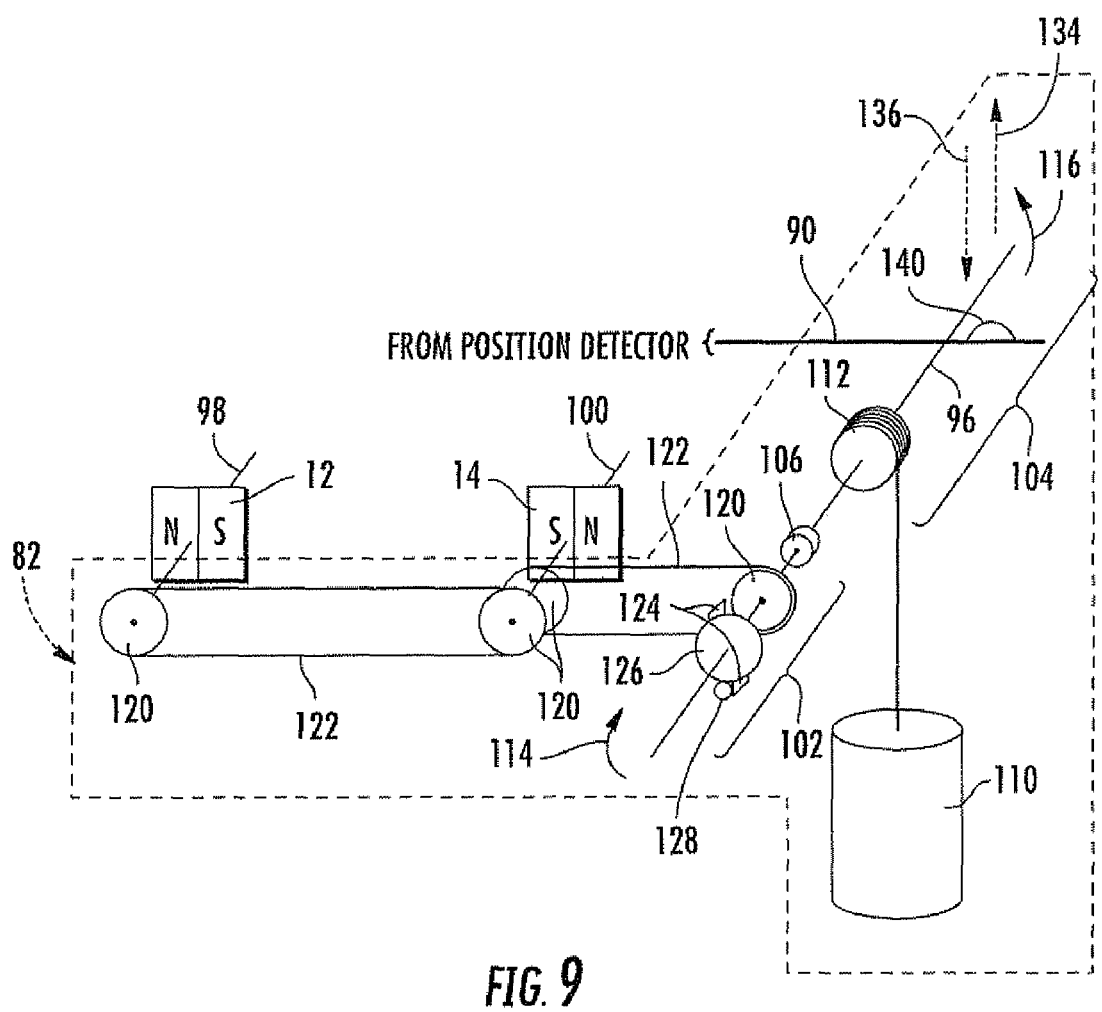
FIG. 9 is a schematic view of an embodiment of the weight control mechanism of FIG. 7.

Referring to FIG. 9, the weight control mechanism 82 includes a rotatably-mounted weight axle 96 and rotatably-mounted first and second magnet axles 98, 100, on which the first and second magnets 12, 14 are mounted. The weight axle 96 is divided into first and second sections 102, 104 connected by a ratchet 106. A weight 110 is suspended from a spool 112 mounted on the second section 104 such that lowering of the weight 110 causes rotation of the first and second sections 102, 104 in the direction of arrow 114. Raising of the weight 110 is accomplished by rotating the second section 104 in the direction of arrow 116. Due to the ratchet 106, the first section 102 does not turn during raising of the weight 110.

A plurality of gears 120 and belts 122 transmit the rotation of the first section 102 to the first and second magnet axles 98, 100, such that rotation of the weight axle 96 in the direction of arrow 114 results in corresponding rotations of the first and second magnets 12, 14. The rotation of the weight axle 96 and the first and second magnet axles 98, 100 is limited by the engagement of teeth 124 of a control gear 126, mounted to the weight axle 96, with a blocking element 128.

The entire weight axle 96 is mounted so as to be slidable up and down in the directions of arrows 134, 136. The weight axle 96 is biased in the direction of arrow 136, for example by gravity and spring pressure and can be displaced in the direction of arrow 134 against the biasing force by engagement between the weight axle 96 and a cam surface 140 on the extension 90. Cooperation of the cam surface 140 of the extension 90 with the weight control mechanism 82 to selectively lower the weight 110 will be explained with reference to FIGS. 10-12.

Figure 10:
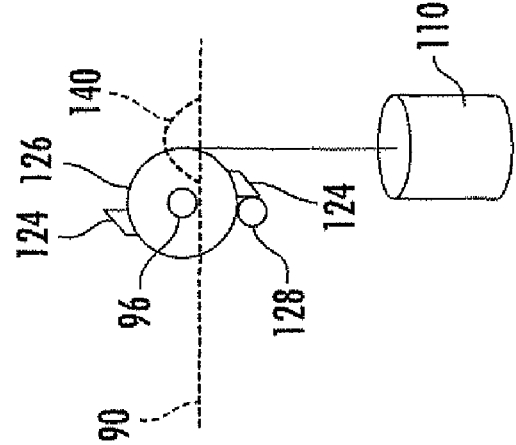
Figure 13:
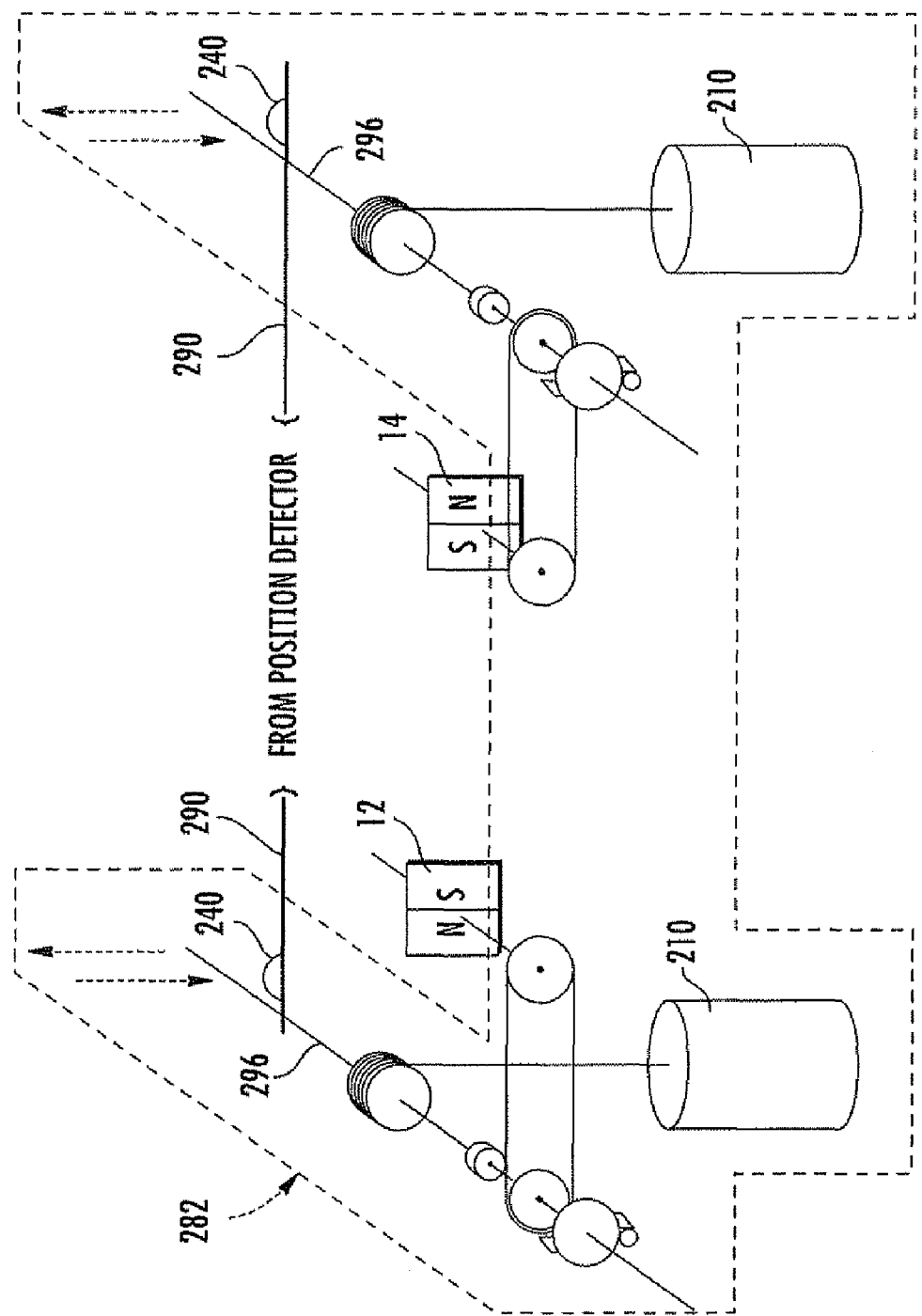
FIG. 13 is a schematic view of another embodiment of the weight control mechanism of FIG. 7.
Figure 14:
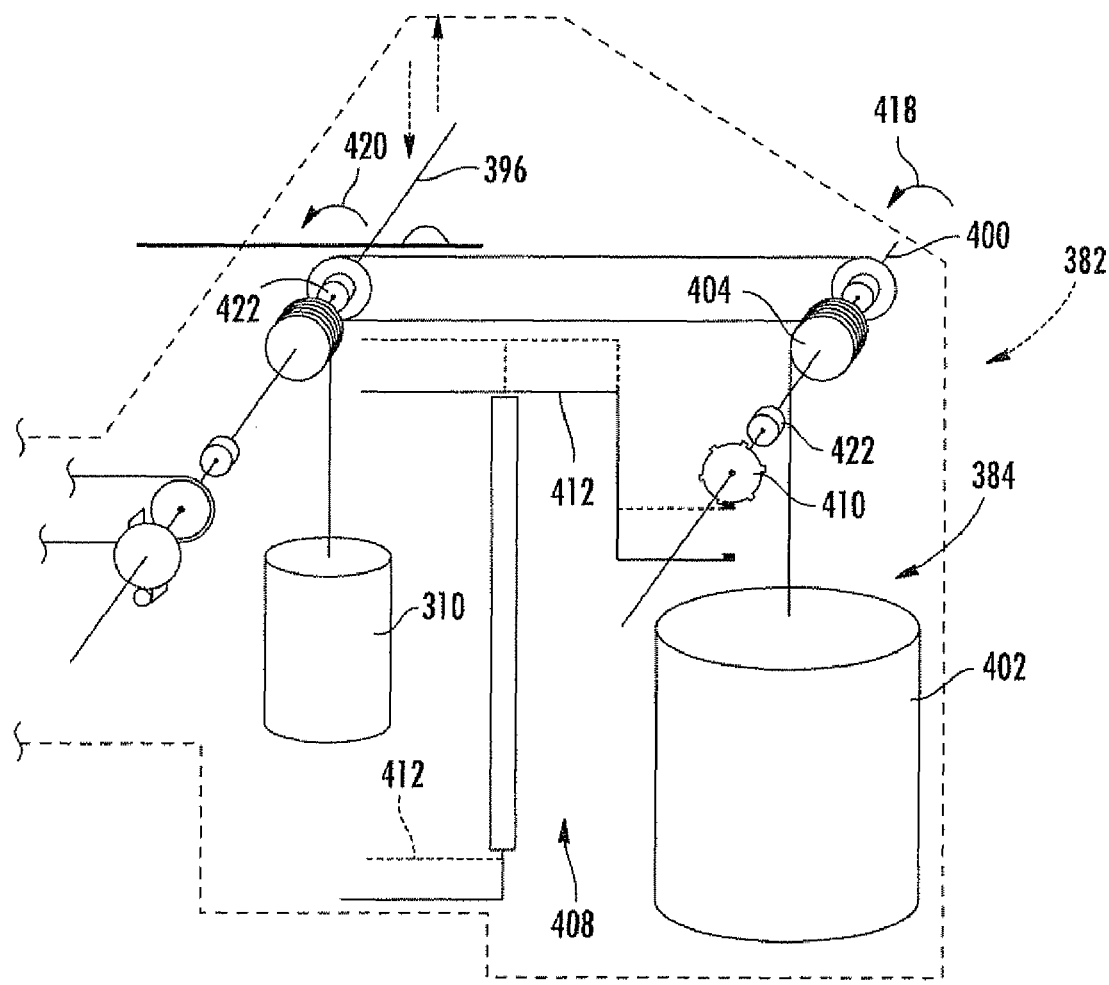
FIG. 14 is a schematic view of a further embodiment of the weight control mechanism of FIG. 7.

Referring to FIG. 10, the extension 90 is fully displaced to the right (directional terms herein referring to the orientation of the components in the Figures). The extension 90 is in this position when the third magnet 16 travels in the direction of arrow 36, prior to reaching the first predetermined point 36 (see FIG. 2). The cam surface 140 is not in engagement with the weight axle 96. The weight axle 96 is prevented from turning because the lower tooth 124 on the control gear 126 is engaged by the blocking element 128.

Figure 11:
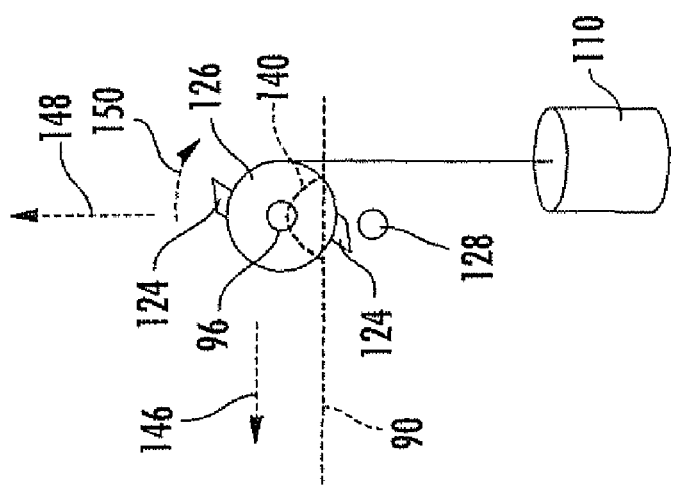

Referring to FIG. 11, as the third magnet 16 approaches the first predetermined position, the slidably-mounted element 88 of the position detector 80 is engaged by the third magnet 16, such that the extension 90 begins to be displaced in the direction of arrow 146. As a result, the cam surface 140 is brought into engagement with the weight axle 96. The cam surface 140 lifts the weight axle 96 in the direction of arrow 148, bringing the lower tooth 124 out of engagement with the blocking element 128. With the lowering of the weight 110, the weight axle 96 begins to rotate in the direction of arrow 150.

Figure 12:
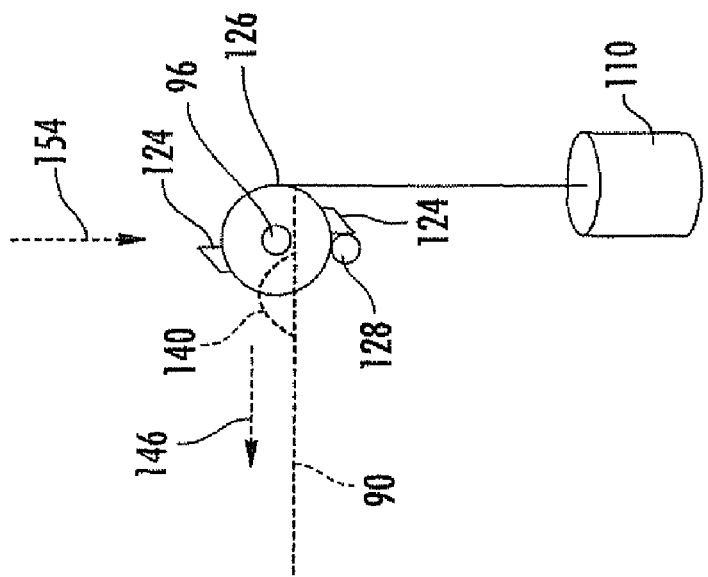
FIG. 10-12 are schematic views of the operation of components of the weight control mechanism of FIG. 9, with hidden components shown in broken lines.

Referring to FIG. 12, once the third magnet 16 has fully displaced the slidably-mounted element 88 and extension 90 to the left, the cam surface 140 is brought out of engagement with the weight axle 96. The weight axle moves back in the direction of arrow 154, such that the lower tooth 124 (previously the upper tooth 124 in FIGS. 10 and 11) engages the blocking element 128, ceasing lowering of the weight 110 and rotation of the weight axle 96.

When the third magnet 16 approaches the opposite end of the slidably-mounted element 88, the interactions between the cam surface 140 and weight axle 96 will happen again in reverse, again resulting in lowering of the weight 110 and rotation of the weight axle 96. The cam surface 140 and the total travel distance of the slidably-mounted element 88 are preferably dimensioned such that the cam surface 140 is engaged with weight axle 96 for less time than is required for 180 degrees of axle 96 rotation. As a result, the weight axle 96, and the associated first and second weights 12, 14, turn only 180 degrees before the blocking element 128 is re-engaged.

In an alternate embodiment, a weight control mechanism 282 has substantially the same components as the above-described mechanism 82, except that duplicate weight axles 296 are employed, such that the first and second magnets 12, 14 are rotated by separate weights 210. Duplicate extensions 290 and cam surfaces 240 extend from the position detector to engage the weight axles 296.

In a further embodiment, a weight control mechanism 382 has a winding mechanism 384. The winding mechanism includes a winding axle 400 connected with a weight axle 396. A winding weight 402 is suspended from a spool 404, mounted on the winding axle 400. A winding axle control mechanism 408 includes a control gear 410, mounted on the winding axle 400, and a slidably-mounted element 410, displaceable between solid- and broken-line positions.

When the element 412 is in the broken-line position, the element 412 engages the control gear 410 and prevents rotation of the winding axle 400. When a weight 310 lowers to a lower limit, the element 412 is displaced to the solid-line position, disengaging the element 412 from the control gear 410. As a result, the winding weight 402 lowers, rotating the winding axle 400 in the direction of arrow 418. Since the winding axle 400 is connected to the weight axle 396, the weight axle 396 rotates in the direction of arrow 420, resulting in raising of the weight 310.

When the weight 310 raises to an upper limit, the slidably-mounted element 412 displaces to the broken-line position, re-engaging the control gear 410 and securing rotation of the winding axle 400. Ratchets 422 allow the winding axle 400 to be rotated to raise the winding weight 402 without lowering the weight 310 or rotating the control gear 410.

The above embodiments are described for exemplary and illustrative purposes. The present invention is not necessarily limited to such embodiments. Instead, those skilled the art will appreciate that various modifications, and adaptations for particular circumstances are possible within the scope of the present invention.

For example, in the described embodiments, linear reciprocal motion is generated. However, reciprocal motion over an arc, curve, sinusoid or other shape could also be generated. Also, while the inventor has found having first and second magnets that are rotatable about axes substantially perpendicular to a reciprocation axis to be advantageous, the present invention is not necessarily limited to such a relationship. For instance, first and second magnets rotatable about axes substantially parallel with the reciprocation axis could also be employed. Additionally, the present invention is not necessarily limited to particular types, sizes or combinations of magnets. The inventor has found permanent magnets to be advantageous, but electromagnets could also be used, for example.

An example is given of the present invention converting reciprocal motion to rotational motion using a crankshaft. The present invention is not necessarily limited to using a crankshaft. For instance, an escapement could be employed. Also, the present invention is not necessarily limited to a single machine connected to a single crankshaft; a plurality of machines connected to one or a plurality of crankshafts could also be utilized. Likewise, in connection with a machine adapted to pump fluid, multiple machines could be employed. The present invention is also not necessarily limited to what work is performed by the machine. For example, the rotational motion or pumped fluid could be used to respectively turn a generator or a turbine. Additionally, the device could be used as a toy or learning aid.

The present invention is not necessarily limited to the switching mechanism embodiments described herein. Different position detectors and weight control mechanisms could be employed. For instance, position detectors utilizing optical, magnetic or electromagnetic sensors could be used to determine the position of the third magnet. Determining when the third magnet reaches a predetermined point need not be a direct assessment that the third magnet has reached the point. For example, such a determination could include assessing a distance or time traveled. Also, travel of a connecting rod or rotation of a crankshaft could also be used to indirectly determine the position of the third magnet.

Also, a predetermined point need not be constant. For instance, as the reciprocation rate of the third magnet increases, the predetermined points detected by the position detector could be moved further from the first and second magnets to allow more time to overcome the increased momentum of the more rapidly moving third magnet.

Additionally, the present invention is not necessarily limited to a weight control mechanism having the particular combination of elements shown and described herein for transferring the motive force of one or more weights to rotate the first and second magnets. Other combinations of linkages, gears, wheels, belts, chains and other elements could also be employed. Also, where multiple machines are utilized, separate weight control mechanisms could be employed for each machine or weight control mechanisms could be shared between machines.

Weight control mechanisms receiving an electronic position input from a position detector could be used. For example, a weight control mechanism could be employed having a timed switch that released the weight for a predetermined interval upon receiving an input form the position detector.

The present invention is also not necessarily limited to a particular motive force for raising weights in the weight control mechanism. Ultimately, any power source could be employed, including manual hoisting, hydraulic power, wind power, or animal power, as some examples.

The foregoing is not an exhaustive list of possible modifications or adaptations. Rather, those skilled in the art will appreciate that these and other modifications and adaptations are possible within the scope of the invention as herein shown and described.

What is claimed is:

1. A machine comprising:
   a first magnet rotatable about a first magnet axis;
   a second magnet spaced apart from the first magnet and rotatable about a second magnet axis substantially parallel to the first magnet axis;
   a third magnet arranged between the first and second magnets and reciprocatable therebetween along a reciprocation axis substantially perpendicular to the first and second magnet axes; and
   a switching mechanism associated with the first and second magnets to rotate the first and second magnets between a first position, in which the first and second magnets respectively attract and repel the third magnet, and a second position, in which the first and second magnets respectively repel and attract the third magnet.

2. The machine of claim 1, further comprising a crankshaft and a connecting rod extending between the crankshaft and the third magnet such that rotation of the crankshaft is impartable by reciprocation of the third magnet.

3. The machine of claim 1, further comprising a rail extending substantially parallel with the reciprocation axis and guiding the third magnet for reciprocation thereon.

4. The machine of claim 1, further comprising an enclosure extending along the reciprocation axis and surrounding the third magnet, at least an inlet and an outlet being formed in an end of the enclosure such that reciprocation of the third magnet is effective to induct and expel a fluid through the inlet and outlet, respectively.

5. The machine of claim 1, wherein the switching mechanism includes a first suspended weight that is selectively releasable to impel rotation of at least one of the first and second magnets.

6. The machine of claim 5, wherein the switching mechanism further includes a slidably-mounted element adjacent to the third magnet such that movement of the third magnet beyond predetermined points in each reciprocation direction results in displacement of the slidably mounted element.

7. The machine of claim 6, wherein the slidably-mounted element is associated with the first suspended weight such that displacement of the slidably-mounted element results in release of the first suspended weight and rotation of at least one of the first and second magnets.

8. The machine of claim 5, wherein the switching mechanism further includes a second suspended weight that is selectively releasable to raise the first suspended weight.

9. A machine comprising:
a first magnet rotatable about a first magnet axis;
a second magnet spaced apart from the first magnet and rotatable about a second magnet axis;
a third magnet arranged between the first and second magnets and reciprocatable therebetween; and
a switching mechanism associated with the first and second magnets to rotate the first and second magnets between a first position, in which the first and second magnets respectively attract and repel the third magnet, and a second position, in which the first and second magnets respectively repel and attract the third magnet, the switching mechanism including a first suspended weight that is selectively releasable to impel rotation of at least one of the first and second magnets.

10. The machine of claim 9, further comprising a crankshaft and a connecting rod extending between the crankshaft and the third magnet such that rotation of the crankshaft is impartable by reciprocation of the third magnet.

11. The machine of claim 10, wherein the crankshaft is associated with the first suspended weight such that rotation of the cranskshaft through predetermined points results in release of the first suspended weight and rotation of the first and second magnets.

12. The machine of claim 10, wherein the connecting rod is associated with the first suspended weight such that movement of the connecting rod through predetermined points results in release of the first suspended weight and rotation of the first and second magnets.

13. The machine of claim 9, further comprising a rail extending substantially parallel with the reciprocation axis and guiding the third magnet for reciprocation thereon.

14. The machine of claim 9, wherein the third magnet is reciprocatable along a reciprocation axis and the reciprocation axis is substantially perpendicular to the first and second magnet axes.

15. The machine of claim 9, further comprising an enclosure extending along the reciprocation axis and surrounding the third magnet, at least an inlet and an outlet being formed in an end of the enclosure such that reciprocation of the third magnet is effective to induct and expel a fluid through the inlet and outlet, respectively.

16. The machine of claim 9, wherein the switching mechanism further includes a slidably-mounted element adjacent to the third magnet such that movement of the third magnet beyond predetermined points in each reciprocation direction results in displacement of the slidably-mounted element, and the slidably-mounted element is associated with the first suspended weight such that displacement of the slidably-mounted element results in release of the first suspended weight and rotation of the first and second magnets.

17. The machine of claim 9, wherein the switching mechanism further includes a second suspended weight that is selectively releasable to raise the first suspended weight.

18. The machine of claim 9, wherein the first suspended weight is selectively releasable to impel rotation of both the first and second magnets.

19. The machine of claim 9, wherein the switching mechanism further includes a second suspended weight, the first suspended weight being selectively releasable to impel rotation of the first magnet and the second suspended weight being selectively releasable to impel rotation of the second magnet.

20. A method of generating reciprocal motion comprising:
orienting opposed first and second magnets such that a third magnet is attracted to the first magnet and repelled from the second magnet;
once the third magnet reaches a first predetermined point, releasing a first suspended weight long enough to rotate the first and second magnets such that the third magnet is repelled from the first magnet and attracted to the second magnet; and
once the third magnet reaches a second predetermined point, releasing the first suspended weight or a second suspended weight long enough to rotate the first and second magnets such that the third magnet is attracted to the first magnet and repelled from the second magnet.

* * * * *